(12) United States Patent
Van Damme et al.

(10) Patent No.: US 10,669,391 B2
(45) Date of Patent: Jun. 2, 2020

(54) COMPRESSIBLE SEALING ELEMENT AND USE THEREOF FOR FILLING THE GAP BETWEEN A STOCK RAIL AND A SWITCH RAIL IN A RAILWAY SWITCH

(71) Applicant: RECTICEL, Brussels (Evere) (BE)

(72) Inventors: Dieter Van Damme, Wetteren (BE); Philippe Vander Schelden, Wetteren (BE); Peter De Wilde, Wetteren (BE); Mario Genetello, Wetteren (BE); Rudi Mortelmans, Wetteren (BE)

(73) Assignee: RECTICEL, Brussels (Evere) (BE)

( * ) Notice: Subject to any disclaimer, the term of this patent is extended or adjusted under 35 U.S.C. 154(b) by 356 days.

(21) Appl. No.: 15/523,561

(22) PCT Filed: Oct. 30, 2015

(86) PCT No.: PCT/EP2015/075340
§ 371 (c)(1),
(2) Date: May 1, 2017

(87) PCT Pub. No.: WO2016/066840
PCT Pub. Date: May 6, 2016

(65) Prior Publication Data
US 2017/0298206 A1 Oct. 19, 2017

(30) Foreign Application Priority Data
Oct. 31, 2014 (EP) ...................................... 14191296

(51) Int. Cl.
*E01B 7/00* (2006.01)
*C08J 9/36* (2006.01)
(Continued)

(52) U.S. Cl.
CPC .................. *C08J 9/36* (2013.01); *B29C 44/14* (2013.01); *B32B 3/28* (2013.01); *B32B 3/30* (2013.01);
(Continued)

(58) Field of Classification Search
CPC ..... E01B 7/00; E01B 7/10; E01B 7/12; E01B 7/20; E01B 7/22
See application file for complete search history.

(56) References Cited

U.S. PATENT DOCUMENTS 1,564,340 A * 12/1925 Garlick ..................... E01B 7/04
246/442
3,312,820 A * 4/1967 Watkins ................ B61L 23/002
246/428
(Continued)

FOREIGN PATENT DOCUMENTS

DE   4343059 A1   6/1995
NL   1004040 C1   3/1998

*Primary Examiner* — Timothy Kennedy
(74) *Attorney, Agent, or Firm* — Browdy and Neimark, PLLC (57) ABSTRACT

The compressible sealing element (1) comprises at least one piece made of a resilient foam (17). This foam has an open-cell content of at least 50% and has such a hardness that it requires a force of less than 2000 N to compress the sealing element (1) per meter length thereof to such an extent that the volume of a rectangular cuboid circumscribing the sealing element is reduced by 40%. The sealing element comprises a water-impermeable cover layer (18) which extends at least over its top surface. The sealing element is intended for filling at least partially the gaps between the stock rails (13) and the switch rails (12) in a railway switch to prevent the switch from being blocked in particular by snow. Advantages of the new sealing element is that it can easier be inserted in these gaps and that it has a smaller effect on the force required to close the switch so (Continued)

that it can also be applied closer to the free extremity of the switch rail (12).

19 Claims, 7 Drawing Sheets

(51) Int. Cl.
| | |
|---|---|
| *B32B 5/02* | (2006.01) |
| *B32B 5/24* | (2006.01) |
| *B32B 3/28* | (2006.01) |
| *B32B 3/30* | (2006.01) |
| *B29C 44/14* | (2006.01) |
| *B32B 5/18* | (2006.01) |
| *B32B 5/22* | (2006.01) |
| *E01B 7/02* | (2006.01) |
| *E01B 7/22* | (2006.01) |
| *B29K 105/04* | (2006.01) |
| *E01B 15/00* | (2006.01) |
| *B29K 75/00* | (2006.01) |
| *E01B 19/00* | (2006.01) |

(52) U.S. Cl.
CPC .................. *B32B 5/02* (2013.01); *B32B 5/18* (2013.01); *B32B 5/22* (2013.01); *B32B 5/245* (2013.01); *C08J 9/365* (2013.01); *E01B 7/02* (2013.01); *E01B 7/22* (2013.01); *B29K 2075/00* (2013.01); *B29K 2105/045* (2013.01); *B29K 2995/0091* (2013.01); *B29K 2995/0093* (2013.01); *B32B 2255/02* (2013.01); *B32B 2255/26* (2013.01); *B32B 2262/101* (2013.01); *B32B 2266/0278* (2013.01); *B32B 2266/06* (2013.01); *B32B 2307/50* (2013.01); *B32B 2307/536* (2013.01); *B32B 2307/7265* (2013.01); *B32B 2581/00* (2013.01); *B32B 2605/10* (2013.01); *C08J 2205/05* (2013.01); *C08J 2375/04* (2013.01); *E01B 15/00* (2013.01); *E01B 19/00* (2013.01); *Y02A 30/38* (2018.01)

(56) References Cited

U.S. PATENT DOCUMENTS

| | | | | |
|---|---|---|---|---|
| 3,656,690 | A | * | 4/1972 | Hanig .................. E01B 1/008 238/2 |
| 3,755,670 | A | * | 8/1973 | Damy .................. E01B 7/12 246/468 |
| 4,083,491 | A | * | 4/1978 | Hill ..................... E01B 3/10 238/98 |
| 4,300,721 | A | * | 11/1981 | Rich .................... E01C 9/06 104/133 |
| 4,447,486 | A | | 5/1984 | Hoppe et al. |
| 8,336,831 | B2 | * | 12/2012 | Naquin ................ E01B 7/00 238/2 |
| 8,714,462 | B1 | * | 5/2014 | Bedford .............. E01B 7/28 238/122 |

* cited by examiner

COMPRESSIBLE SEALING ELEMENT AND USE THEREOF FOR FILLING THE GAP BETWEEN A STOCK RAIL AND A SWITCH RAIL IN A RAILWAY SWITCH

The present invention relates to a compressible sealing element for filling the gap between a stock rail and a switch rail in a railway switch. The sealing element comprises at least one piece which is made of a resilient foam and which has a top surface, two opposite lateral surfaces and a bottom surface. The invention also relates to the use of such a compressible sealing element for filling at least partially the gap between a stock rail and a switch rail in a railway switch, wherein the sealing element is applied in said gap with its two opposite lateral surfaces in abutment with said stock rail and respectively with said switch rail.

Sealing elements can be applied in the gaps between switch rails and stock rails of railway switches to prevent these switches from being blocked by accumulation of materials such a snow and/or dirt in these gaps. In cold climates, especially the build-up of snow in railway switches is a major problem. If the gaps between the switch rails and the seal rails are not filled with such compressible sealing elements, the snow has to be removed manually or automatically by means of blowers or usually by means of a heating system. Such systems are however quite expensive and require a lot of energy (electricity or gas). Moreover, they should be reliable which may also be a problem since they are subjected to all kinds of weather conditions and also to wind and dust generated by passing trains.

Sealing elements made of closed-cell ethylene foam for preventing snow from accumulating between the rails of railway switches have already been publicly in use. An advantage of such sealing elements is that water cannot penetrate therein. Moreover, they don't soak up moisture and therefore don't freeze, even in cold climates.

An important drawback of the closed-cell polyethylene foam sealing elements is however that the pressure required to compress them quickly rises, even exponentially, when they are being compressed to a larger extent. In a railway switch, the actual displacement of the switch rails is larger towards their free (distal) extremities. At these extremities, the gap between the switch rails and the stock rails has moreover the smallest width so that relative reduction of the width of the gap reaches a maximum near the free extremities of the switch rails. In practice, the polyethylene foam sealing elements are therefore not applied close to the free extremities of the switch rails as they would at that location strongly increase the force required to pull the switch rail against the stock rail, i.e. to close the switch. Moreover, the closed-cell foam is not suited to be compressed to such a large extent and would get damaged. At least at that location, a heating system is therefore still required.

A further drawback of the polyethylene foam sealing elements is that, since they have to be applied underneath the laterally projecting heads of the switch and the stock rails, they have to be compressed manually to a quite large extent to be able to pass the narrow gap between the heads of the switch rail and the stock rail. The known closed-cell polyethylene foam sealing elements are therefore made in two layers which are applied one on top of the other in the gaps. Each of these layers has a flat top surface and a transversally undulated bottom surface. In this way, the flexibility of each of the layers is improved. Both layers are applied on top of one another with the undulated bottom surfaces facing each other and fitting in one another. Notwithstanding this layered structure, the sealing elements are still quite difficult to be inserted in the gaps between the rails underneath the heads of these rails. Moreover, the fact that the sealing elements are composed of two superimposed layers doesn't reduce the relatively large force required to close the switch. On the other hand, the risk that as a result of the vibrations and the wind generated by a passing train the foam layers may be blown out of the gap between the rails is increased.

An object of the present invention is therefore to provide new compressible sealing elements which are easier to be inserted in the gaps between the switch and stock rails of a railway switch and which have a smaller effect on the force required to close the switch so that they can be applied closer to the free extremity of the switch rail.

To this end, the sealing element according to the invention is characterised in that said foam has an open-cell content of at least 50%, in that a rectangular cuboid circumscribing the sealing element and having a top face tangent to said top surface, two lateral faces tangent to said two lateral surfaces and a bottom face tangent to said bottom surface has, in the uncompressed state of the sealing element, a predetermined total volume and said foam has such a hardness that it requires a force of less than 2000 N to compress the sealing element per meter length thereof in a direction perpendicular to the lateral faces of said rectangular cuboid until the total volume of the rectangular cuboid circumscribing the compressed sealing element is reduced to 60% of said predetermined total volume, in that the sealing element comprises a water-impermeable cover layer which extends at least over said top surface, and in that the top surface has two upwardly projecting ridges extending respectively along one of the two opposite lateral surfaces of the sealing element.

Due to the fact that at least 50% of the cells of the foam are open, the foam can be compressed to a considerable extent before the pressure required to compress the foam starts to increase exponentially or before the foam cells may get damaged. The sealing element can thus be applied also closer to the free extremity of the switch rail where the width of the gap between the switch rail and the stock rail is for example reduced with up to 50%, 75% or even up to 90% when closing the switch rail. By selecting a foam hardness so that it requires a force of less than 2000 N, preferably less than 1500 N, more preferably less than 1000 N and most preferably less than 750 N, per meter length of the sealing element, to compress the sealing element in its transverse direction to 60% of the volume of the circumscribed rectangular cuboid, the force required to close the switch rail can be kept sufficiently low. During this compression, the top and bottom faces of the rectangular cuboid should be kept on a same distance from one another so that the sealing element is compressed until its width comprises 60% of its initial width. Even in case of alternating cycles of freezing and thawing no ice can be formed in the open-cell foam of the sealing element when it is covered with snow since the top surface of the sealing element is formed by a water-impermeable cover layer.

The ridges on the top surface are intended to engage the underside of the heads of the rails. An advantage thereof is that the ridges can easily be compressed somewhat in case the sealing element has a height which is somewhat larger than the height of the web between the base and the head of the rails. Moreover, next to the ridges the top surface of the sealing element is recessed so that the risk that this top surface may come in contact with the wheels of a passing train, in particular with the flanges thereof, is reduced. Also when a ballast stone might have arrived on top of sealing element, this ballast stone cannot get stuck, near the free extremity of the switch rail, between the heads of the switch rail and the stock rail when the switch rail is closed.

In a preferred embodiment of the sealing element according to the present invention, it has a longitudinal direction and comprises an elongated groove in the top surface of said piece of foam which extends in said longitudinal direction, the groove being sized and located with respect to the lateral faces to prevent the sealing element from bending upwards, in the direction from said bottom surface to said top surface upon a lateral compression of the sealing element to 60% of said predetermined total volume.

It has been found that, without such a groove, the sealing element bends upwards, seen in a direction transverse to its lateral surfaces, so that the top surface of the sealing element may come in contact with the wheels of the passing train or tram. This occurs independent of the fact that the piece of foam is covered with a cover or not. It therefore appears that this upward bending should be due to the presence of the ridges on both lateral edges of the top surface. Surprisingly it has been found that, when providing an elongated groove in the longitudinal direction in the top surface of the piece of foam, the central portion of the sealing element bends downwards instead of upwards.

Preferably, in the uncompressed state of the sealing element, the groove is located in the middle 60% of the top surface, preferably in the middle 50% of the top surface and more preferably in the middle 40% of the top surface.

In a further preferred embodiment of the sealing element according to the present invention, the cover layer is supported underneath the top surface of the sealing element by said foam and is adhered over substantially the entire top surface of the sealing element to said foam.

In this embodiment, the cover layer is prevented from undulating upwards when the sealing element is compressed so that there is no risk that the cover layer may come in contact with the wheels of the train passing over the switch, in particular with the flanges thereof.

In a still further preferred embodiment of the sealing element according to the present invention, said foam is a polyurethane foam, preferably a polyurethane foam having an open-cell content of at least 90%, more preferably a reticulated polyurethane foam.

Reticulated polyurethane foams are usually produced from flexible open-celled foams having a skeletal framework of relatively heavy strands connected by very thin membranes, often called windows, which form the cell walls. In open-celled foams, some of the windows are open or torn in each cell, thus forming an interconnecting network open to fluid flow. Reticulation relates to methods for removing or breaking the cell windows of polyurethane foams. Mechanical, chemical and thermal methods for reticulating foams are known. As one example, foam may be reticulated by destroying substantially all of the windows with a high temperature flame front or explosion, which still leaves the strand network intact. Alternatively, the cell windows may be etched away using the hydrolysing action of water in the presence of an alkali metal hydroxide. Various reticulating methods of polyurethane foams are for example disclosed in U.S. Pat. Nos. 3,405,217, 3,423,338, 3,425,890 and 4,670,477. Compared to conventional open-celled foams, the reticulated foams produced therefrom are generally softer which is advantageous in the present sealing elements since such a reduced hardness reduces the forces required to compress the sealing element.

In an advantageous embodiment of the sealing element according to the present invention, said foam has a water uptake, determined at 25 deg. C. in accordance with the French standard UEAtc H.1 MOD1, of less than 150 g/m$^2$, preferably of less than 100 g/m$^2$ and more preferably of less than 75 g/m$^2$.

An advantage of this embodiment is that when the sealing element rests on a humid underground, or even in a thin layer of water, it only wicks water to a limited height so that even when this water freezes, the resilient properties of the sealing element are sufficiently maintained.

In a further advantageous embodiment of the sealing element according to the present invention, the lateral sides of said rectangular cuboid circumscribing the sealing element in its uncompressed state of the sealing element have a height of at least 50 mm, preferably at least 70 mm, more preferably at least 90 mm and most preferably at least 100 mm, which height is preferably smaller than 130 mm, more preferably smaller than 120 mm and most preferably smaller than 110 mm.

With these heights, the sealing element fits between the base and the head of the switch and stock rails of railway switches of trains or trams.

The present invention also relates to the use of a compressible sealing element according to the invention for filling at least partially the gap between a stock rail and a switch rail in a railway switch, wherein the sealing element is applied in said gap with its two opposite lateral sides in abutment with said stock rail and respectively with said switch rail.

The present invention finally also relates to a method for filling at least partially the gap between a stock rail and a switch rail in a railway switch, in particular for preventing the railway switch from being blocked by accumulation of materials such a snow and/or dirt in said gap, in which method at least one compressible sealing element, which comprises at least one piece made of a resilient foam, is inserted in said gap. The sealing element has a top surface, two opposite lateral surfaces and a bottom surface, with a rectangular cuboid circumscribing the sealing element and having a top face tangent to said top surface, two lateral faces tangent to said two lateral surfaces and a bottom face tangent to said bottom surface having, in the uncompressed state of the sealing element, a predetermined total volume. This method is characterised in that said foam has an open-cell content of at least 50% and such a hardness that it requires a force of less than 2000 N to compress the sealing element per meter length thereof in a direction perpendicular to the lateral faces of said rectangular cuboid until the total volume of the rectangular cuboid circumscribing the compressed sealing element is reduced to 60% of said predetermined total volume, and the sealing element comprises a water-impermeable cover layer which extends at least over said top surface, the sealing element being in particular a sealing element according to the present invention.

Other particularities and advantages of the invention will become apparent from the following description of some particular embodiments of the compressible sealing element and of the use thereof according to the present invention. The reference numerals used in this description relate to the annexed drawings wherein.

Figure 3:
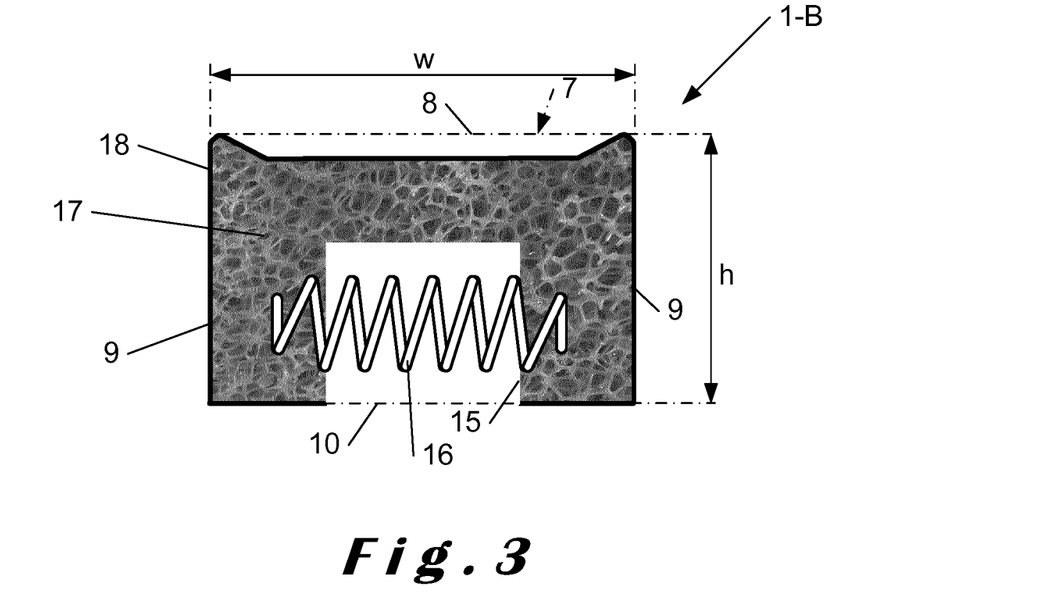
FIG. 3 is a same view as FIG. 1 but illustrating a compressible sealing element which has a smaller width and the bottom surface of which shows moreover a groove wherein helical compression springs are provided.

A cross-section of a rectangular cuboid 7 circumscribing the sealing element 1 in its uncompressed state is also illustrated in FIG. 3. This rectangular cuboid 7 has a top face 8 which is tangent to the top surface 2 of the sealing element 1, two opposite lateral faces 9 which are tangent to the lateral surfaces 3, 4 of the sealing element 1 and a bottom face 10 which is tangent to the bottom surface 5 of the sealing element 1. All of these faces are perpendicular to the adjacent faces. The rectangular cuboid 7, which has a length equal to the length of the sealing element 1, has a predetermined volume in the uncompressed state of the sealing element 1.

Figure 2:
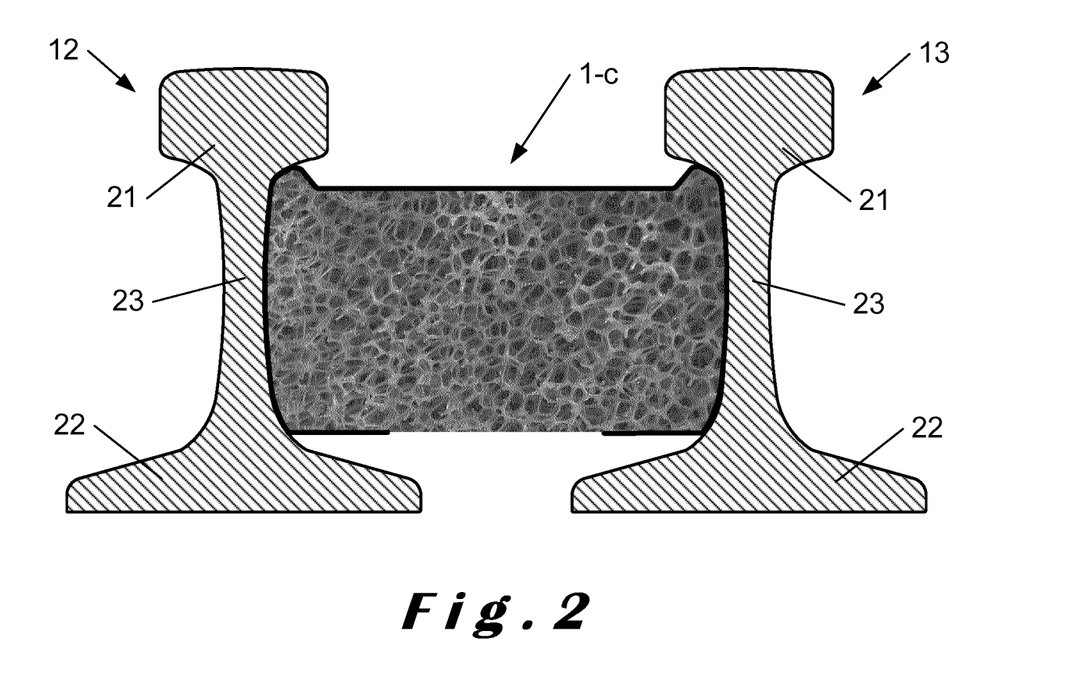
FIG. 2 is a cross-sectional view of the sealing element illustrated in FIG. 1 but inserted in the gap between an open switch rail and a stock rail of a railway switch.
Figure 4:
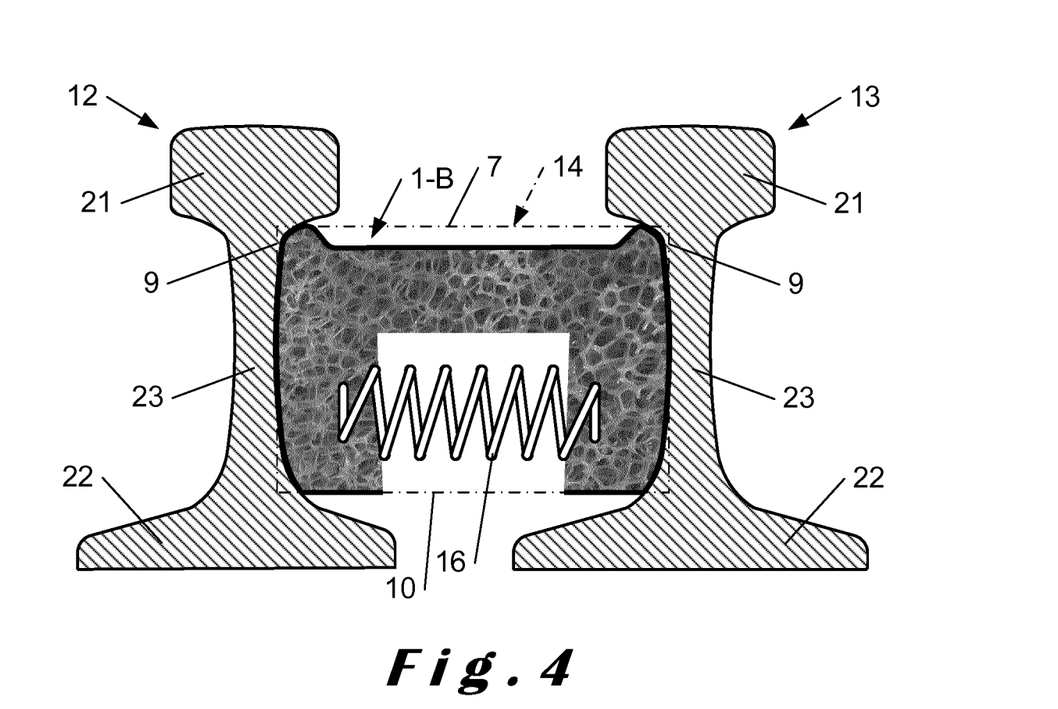
FIG. 4 shows the sealing element illustrated in FIG. 3 applied in the gap between the switch rail and the stock rail of the railway switch.
Figure 6:
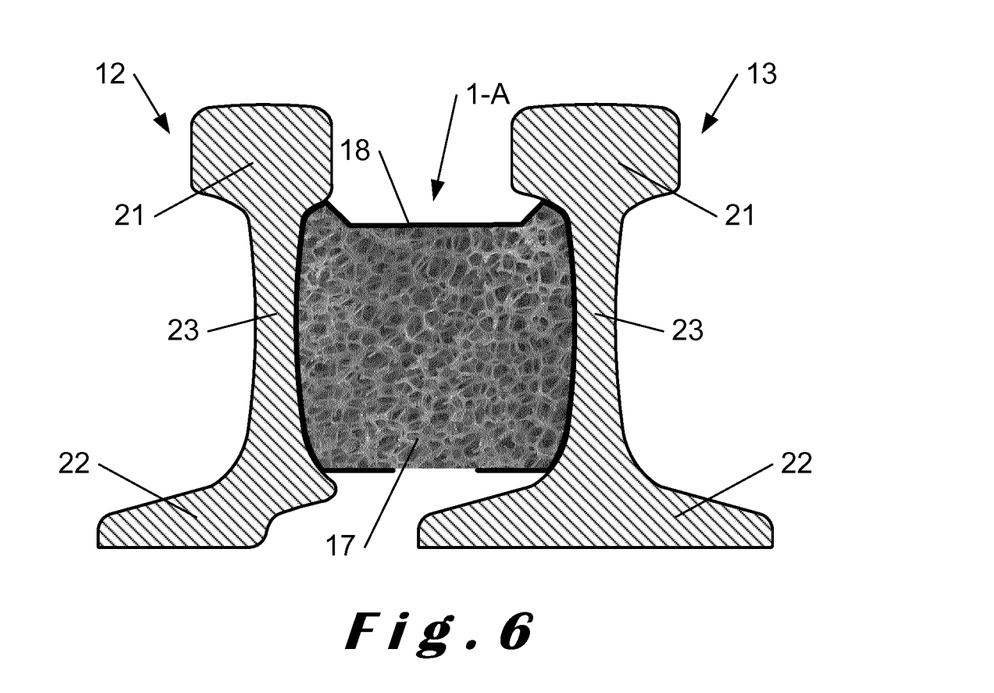

The sealing elements 1 are preferably oversized to some extent so that when they are inserted in the gap 11 between a switch rail 12 and a stock rail 13 of a railway switch, in the open position of the switch rail 12, the sealing elements 1 are compressed to some extent. In particular the rectangular cuboid 14 circumscribing the sealing element 1 when compressed between the switch rail 12 and the stock rail 13 in the open position of the switch rail 12 has, as indicated in FIGS. 2, 4 and 6 a volume which is preferably at least 5%, more preferably at least 10% smaller than the volume of the rectangular cuboid 7 which circumscribes the sealing element 1 in its uncompressed state. When the switch rail 12 is closed, the sealing element 1 is compressed to a smaller volume, so that the volume of the circumscribing rectangular cuboid may be 50%, 70% or closer to the free extremity of the switch rail even 90% smaller than the volume of the rectangular cuboid 7 circumscribing the sealing element 1 in its uncompressed state.

The sealing elements 1 illustrated in the drawings consist of a piece of resilient foam 17 and of a water-impermeable cover layer 18 fixed to the piece of foam 17. In the embodiment illustrated in FIGS. 3 and 4 a groove 15 is provided in the bottom surface of the piece of resilient foam 17 and transverse helical compression springs 16 are provided in this groove 15. The presence of the groove 16 is intended to reduce the force needed to compress the sealing element 1. The compression springs 16 increase this force but are especially intended to assist the sealing element 1 from recovering its initial volume when the switch rail 12 is moved from its closed to its open position. The helical compression springs 16 can also be provided in the foam 17 itself, preferably embedded in pockets, in order to accelerate the expansion of the foam 17 when the switch rail 12 is opened.

The foam 17 has preferably a hysteresis loss which is smaller than 55%, preferably smaller than 50% and more preferably smaller than 45%, measured in accordance with ISO 3386-1:1986 (on the $4^{th}$ compression curve). A lower hysteresis loss corresponds to a higher resilience and to a quicker recovery of the initial foam volume when releasing the compression pressure. As explained hereabove, the recovery of the foam can be improved by embedding compression springs in the foam.

The foam 17 has an open-cell content of at least 50%. This means that less than 50% of the cells of the foam are entirely closed, i.e. have intact cell walls. The open-cell content of the foam 17 comprises preferably at least 70% and more preferably at least 90%. The foam is in particular preferably a reticulated foam, i.e. a foam which comprises no closed cells.

Compared to a closed cell foam, an open-cell foam has a lower CDH value (Compression load Deflection Hardness) at 40% compression. The open-cell foam 17 used in the sealing elements 1 of the present invention has preferably a CDH40 value, measured in accordance with ISO 3386-1: 1986, smaller than 20 kPa, preferably smaller than 15 kPa, more preferably smaller than 10 kPa and most preferably smaller than 7.5 kPa. The CDH40 value of the foam is preferably larger than 0.5 kPa, more preferably larger than 1 kPa and most preferably larger than 2 kPa. The foam is a resilient foam and has in particular a resilience, measured in accordance with ASTM D 3574-11 H (ball rebound), which is larger than 25%, preferably larger than 30%.

The foam 17 is preferably a polyurethane foam. The piece of polyurethane foam 17 can be moulded in a closed mould but preferably it is cut out of a larger foam block.

The sealing element 1 may comprise one piece of foam 17, as illustrated in the figures, or two or more pieces of foam. These foam pieces can be adhered to one another, for example by means of a glue, or they can be kept together by the cover layer surrounding the pieces of foam. Preferably the foam of all the different foam pieces has the foam properties described hereabove. In the uncompressed state of the sealing element 1, the piece or pieces (if there is more than one piece) of resilient foam 17, have a volume which is at least equal to 25%, preferably at least equal to 40% and more preferably at least equal to 60% of the predetermined total volume of the rectangular cuboid 7 which circumscribe the sealing element 1 in its uncompressed state.

Since the foam 2 is an open-cell foam it is not water-tight. In order to prevent for example melt water from penetrating into the foam (for example when the sun shines) and freezing again therein (for example when the evening falls) so that the compressibility of the sealing element would be lost, the sealing element 1 of the present invention comprises a water-impermeable cover layer 18 which extends at least over the top surface 2 of the sealing element 1. In the sealing element 1 illustrated in the figure, the cover layer 18 extends over the entire top surface 2 of the sealing element. It further extends over the entire height of the lateral surfaces 3, 4 so that no water can penetrate into the piece of foam 17.

On the bottom surface 5 the sealing element 1 is not provided with a cover layer or only on a portion thereof, for example along the two lateral edges of the bottom surface 5. In this way a large surface area is available for letting the air contained in the pores of the foam 17 escape so that the switch rail 12 can be closed quickly, for example in three seconds as is usual for railway switches.

When the sealing element 1 rests on a humid surface, water can wick through the bottom surface 5 into the foam 17, at least in case this foam would be hydrophilic. The foam used in the sealing element 1 is however preferably a hydrophobic foam, such as a hydrophobic polyurethane foam. If necessary, the hydrophobic properties of the foam can be increased after the production thereof by impregnating it with water-repellent substances such as waxes.

The foam has preferably such hydrophobic properties that the water uptake of the foam, determined at 25 deg. C in accordance with the French standard UEAtc H.1 MOD1, is smaller than 150 g/m$^2$, preferably smaller than 100 g/m$^2$ and more preferably smaller than 75 g/m$^2$. According to this standard, the water uptake is measured at 25° C. for samples of 150×150×20 mm, which test can be performed as described in WO 01/00718.

In the sealing element 1 illustrated in the drawings, the cover layer 18 is supported underneath the top surface 2 of the sealing element 1 by the resilient foam 17 and is adhered over substantially the entire top surface 2 to this foam 17. The cover layer 18 is preferably adhered continuously to the foam 17 but it can also be adhered in spots thereto, which spots are distributed of the entire top surface 2 so that when the sealing element 1 is compressed for example to 60% of its initial volume, the cover layer 18 remains over the entire top surface 2 in contact with the foam or extends locally at a distance of at most 5 mm, preferably of at most 2 mm, from the surface of the foam 17. In this way, when the switch rail 12 is closed and the sealing element 1 compressed, there is no risk that the cover layer 18 may project upwards from the surface of the foam piece and come into contact with the wheels of the passing train or tram.

The cover layer 18 may be laminated onto the piece of foam 17. This can be done by a suitable adhesive or for example by flame lamination. The cover layer 18 may comprise a textile layer which is provided with a coating, for example a glass fibre fabric coated with polyurethane or a tarpaulin comprising a PVC coating.

The cover layer 18 may also comprise a coating layer which is applied in liquid form onto the piece of foam 17. This coating layer may be an isocyanate-based coating layer which is applied in liquid form onto the foam 17, for example by spraying it thereon in the way as described in EP-B-0 303 305. This isocyanate-based coating layer comprises in particular a polyurethane coating layer, a polyurea-modified polyurethane coating layer or a polyurea coating layer. A polyurea coating layer is preferred in view of its high wear resistance. Prior to applying the liquid coating material, a thin permeable layer can be applied onto the foam 17, which layer is less permeable than the foam 17 to prevent the liquid coating material to penetrate over a too large distance into the foam, in particular when being applied by a spray process. Alternatively, the foam can however also be dipped into the liquid coating material or the piece of foam can be overmoulded with the liquid coating material, in particular in accordance with a ROM process (Reaction OverMoulding process), as disclosed for example in EP-B-2 024 158.

To adhere the cover layer 18 to the foam, the foam 17 can be produced/moulded against the cover layer 18, for example starting from a foamable polyurethane reaction mixture. The cover layer 18 can be positioned first in the mould or it can be produced therein. When the foam 17 is moulded against a mould surface, it is finally also possible to use an integral skin technique wherein a closed skin is produced against the mould surface. Optionally, the mould surface may first have been coated with a so-called in-mould coating, which may be a paint layer or an elastomeric skin layer (for example an elastomeric polyurethane layer).

In accordance with the present invention, the foam 17 has an open-cell content of at least 50% and has moreover such a hardness that it requires a force of less than 2000 N, preferably of less than 1500 N, more preferably of less than 1000 N and most preferably of less than 750 N, to compress the sealing element 1 per meter length thereof in a direction perpendicular to the lateral faces 9 of the rectangular cuboid 7 circumscribing the sealing element 1 in its uncompressed state until the total volume of the rectangular cuboid circumscribing the compressed sealing element 1 is reduced with 40%, i.e. to 60% of its initial volume, whilst the top and bottom faces are kept at a constant distance from one another. The sealing element is thus compressed with 40% by only reducing its width to 60% of its uncompressed width. Such reduced compression forces can be achieved with the open-cell foam described hereabove. A minimum force of at least 50 N, preferably of at least 100 N and more preferably of at least 200 N per meter length of the sealing element 1, to compress it to 60% of the initial volume of the circumscribing rectangular cuboid, is however preferred in order to be able to clamp the sealing element 1 with a relatively high pressure between the switch 12 and the stock rail 13 so that it is firmly stuck between both rails.

Figure 1:
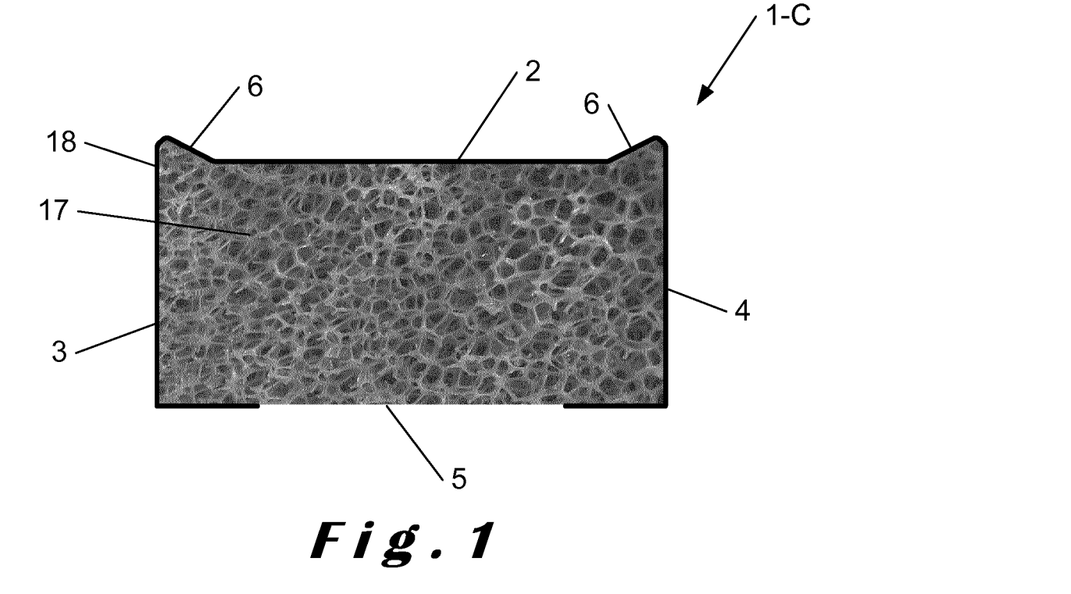
FIG. 1 is a cross-sectional view through a first compressible sealing element accordance to the present invention.
Figure 5:
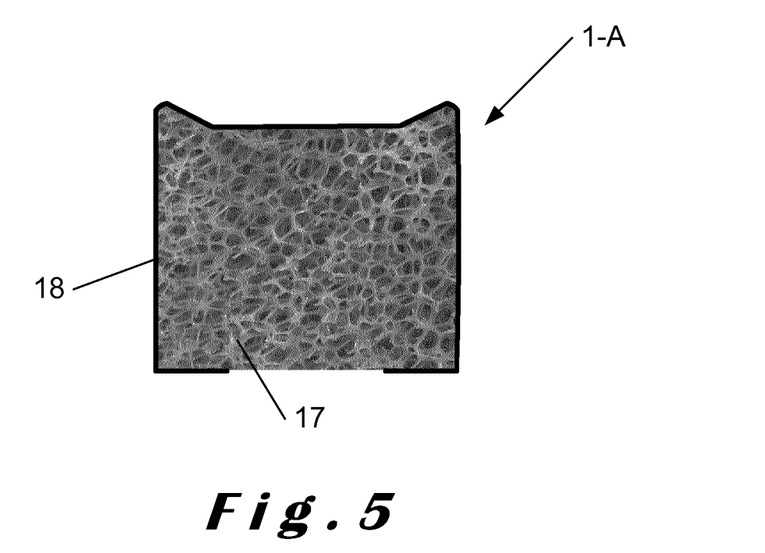
FIGS. 5 and 6 correspond to FIGS. 1 and 2 but illustrate a narrower sealing element which can be applied closer to the free extremity of the switch rail.
Figure 7:
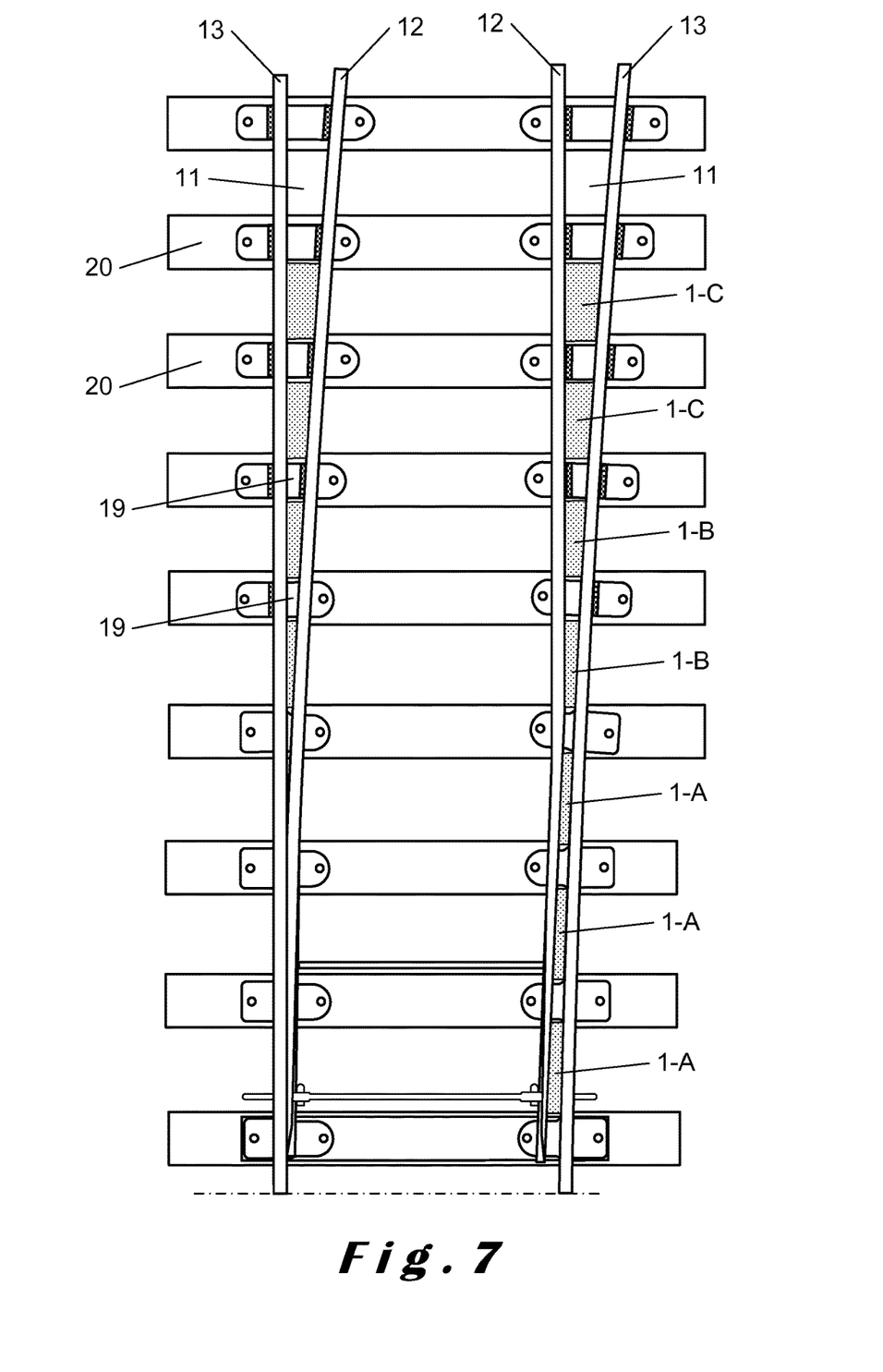
FIG. 7 is a schematic top plan view on a railway switch wherein three sealing elements as shown in FIG. 5, two sealing elements as shown in FIG. 3 and two sealing elements as shown in FIG. 1 are applied in each of the two gaps of the railway switch.

A railway switch provided with sealing elements 1 in the gaps 11 between the switch rails 12 and the stock rails 13 is shown in FIG. 7. Three sealing elements 1-A (illustrated in FIGS. 5 and 6), having a width w of 110 mm and a length of 800 mm are applied near the free extremity of each of the switch rails 12, then two sealing elements 1-B (illustrated in FIGS. 3 and 4), having a width w of 160 mm and also a length of 800 mm are applied more to the proximal end of the switch rail 12 and finally two sealing elements 1-C (illustrated in FIGS. 1 and 2) which have a width w of 190 mm and a length of 800 mm. A gap 19 is each time provided between the sealing elements 1, more particularly at the locations where the switch rail 12 is slidably mounted onto the railway sleepers 20.

At the locations where the sealing elements 1 are provided, the switch rail 12 and the stock rail 13 have a widened head 21 and a widened base 22 connected to each other by a vertical web 23. Closer to the distal extremity of the switch rail 12 the width of the widened head 21 may be reduced somewhat, as can be seen in FIG. 7. The sealing elements either fit vertically between these heads 21 and bases 22 with no clearance or with a clearance which is smaller than 10 mm and preferably smaller than 5 mm so that they are always correctly positioned. Preferably, they are clamped between the heads 21 and the bases 22 of the switch rail 12 and between the heads 21 and the bases 22 of the stock rail 13 so that they are not only correctly positioned but also clamped more strongly between the rails 12, 13.

The different sealing elements 1-A, 1-B and 1-C all have the same height. This height is defined as the height h of the lateral faces 9 of the rectangular cuboid 7 circumscribing the sealing element 1 in its uncompressed state. These lateral faces 9 have a height h of at least 50 mm, preferably at least 70 mm, preferably at least 90 mm and most preferably at least 100 mm. The height h is preferably smaller than 130 mm, more preferably smaller than 120 mm and most preferably smaller than 110 mm.

The height h also includes the height of the ridges 6 on top of the sealing elements 1. In case the height h of the sealing elements 1 is oversized, the ridges 6 can be easily compressed when inserting the sealing elements 1 between the switch 12 and stock rails 13. In between the ridges 6, the sealing elements 1 have a height which is smaller than the height h. Even when the top surfaces 2 of the sealing elements 1 may undulate somewhat when they are transversally compressed by closing the switch rail 12, they will never come into contact with the wheels of the passing train. Moreover, the smaller height of the sealing elements 1 in between the ridges 6 reduces the force required to compress the sealing elements 1 transversally, both when inserting the sealing elements 1 in the gap 11 between the switch 12 and the stock rail 13 and when closing the switch rail 12. A further reduction of this force can be obtained by further reducing this height or by providing one or more grooves 15 in the bottom surface 5 of the sealing elements 1 or by providing cavities therein. Such cavities can be produced by cutting transverse holes in the piece of foam 17 before applying the cover layer 18 thereon. Optionally, helical compression springs 16 can be provided into these transverse holes before the cover layer 18 is applied thereon. As already described, these compression springs 16 increase the recovery speed of the sealing elements 1 when the switch is opened again so that, even when quickly opening the switch rail 12, the sealing elements 1 remain continuously pressed against the switch 12 and the stock rail 13.

Figure 8A:
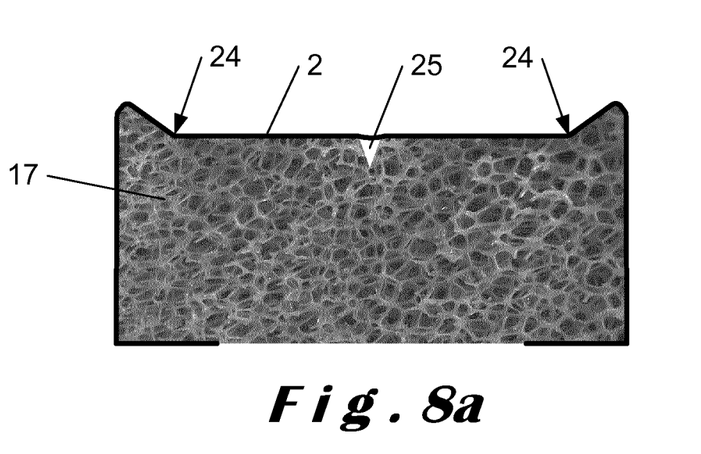
FIGS. 8a, 8b and 8c are a same view as FIG. 1 but illustrating a compressible sealing element which has a groove with a V-shaped cross-section, a U-shaped cross-section and a trapezium-shaped cross-section respectively.
Figure 8B:
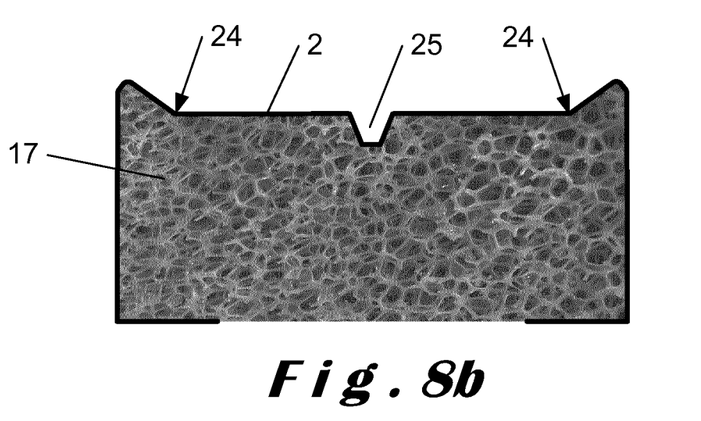
Figure 8C:
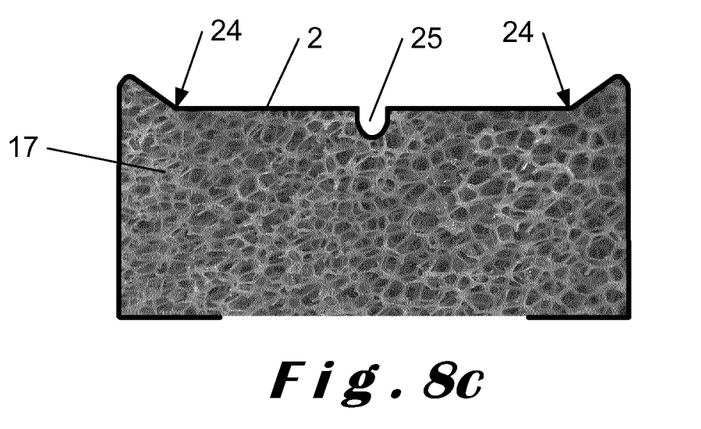

FIGS. 8*a*, 8*b* and 8*c* illustrate a compressible sealing element 1 which has an elongated groove 25 which extends in the top surface of the sealing element 1 in the longitudinal direction thereof. Three different cross-sectional shapes of the groove 25 are illustrated in FIGS. 8*a* to 8*c*, namely a V-shape, a trapezium shape and a U-shape respectively. The cover layer 18 can follow the cross-section of the groove 25 as in FIGS. 8*b* and 8*c*, or it can be adhered over the groove 25 such that there is locally no contact between the top surface 2 and the cover layer 18. The groove 25 is located substantially in the middle of the top surface. The groove 25 has a width relative to the distance between the lateral faces of the rectangular cuboid 7 in the uncompressed state of at least 1% of said distance, preferably at least 2% of said distance and more preferably at least 3% of said distance, which width is preferably smaller than 25% of said distance, more preferably smaller than 20% of said distance and most preferably smaller than 10% of said distance. The groove 25 has a depth relative to the width thereof of at least 90% of said width, preferably at least 110% of said width and more preferably at least 130% of said width.

FIGS. 9*a*, 9*b*, 9*c* and 9*d* illustrate a compressible sealing element 1 which has no groove 25 in the top surface 2 of the piece of foam. The compressible sealing element 1 is shown before lateral compression (9*a*) and at three successive moments during lateral compression (9*b*, 9*c* and 9*d*). These figures illustrate that without a groove 25 in the top surface 2 the compressible sealing element 1 bends upwards in the direction of the top surface 2. In this way, when the switch rail 12 is closed and the sealing element 1 compressed, there is a risk that the cover layer 18 may come into contact with the wheels of the passing train or tram, in particular with the flanges of these wheels.

Figure 9A:
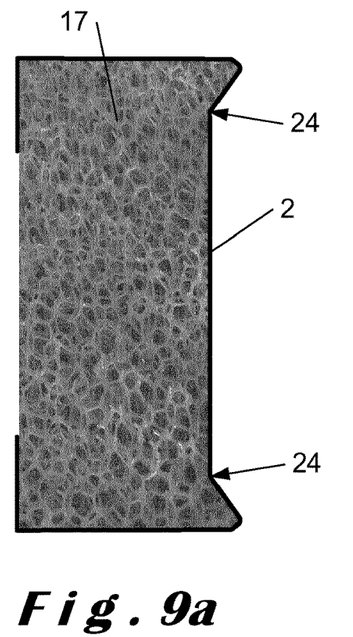
FIGS. 9a, 9b, 9c and 9d are a same view as FIG. 2 and illustrate a compressible sealing element which has no groove before lateral compression (9a) and at 3 moments during lateral compression (9b, 9c and 9d)
Figure 9B:
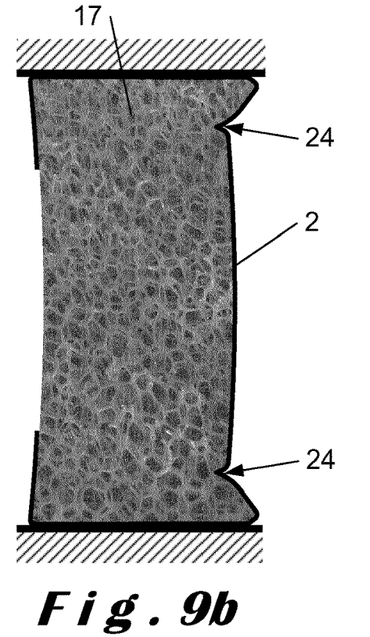

FIG. 9*a* shows the sealing element 1 before lateral compression. The cover layer 18 is adhered over substantially the entire top surface 2 and forms an corner 24 at the foot of the ridges 6. Upon compressing the sealing element 1 the angle of the corners 24 in the cover layer 18 become more acute and in the vicinity of the corners 24 the cover layer 18 is displaced downwards which in turn displaces the foam at the foot of the ridges 6 towards the bottom surface 5 as illustrated in FIG. 9*b*. Near the centre of the top surface 2 the cover layer 18 is displaced upwards together with the foam which is situated underneath the cover layer 18.

Figure 9C:
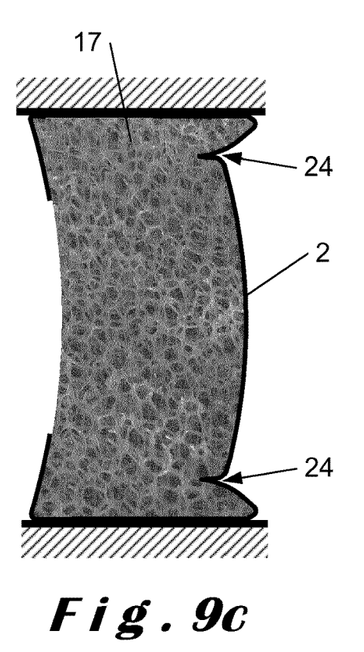

A further compression stage is illustrated in FIG. 9*c*. In this stage, the angle of the corners 24 have become more acute and have displaced more downwards as compared to FIG. 9*b*. Likewise, in the centre of the sealing element 1 both the foam and the cover layer 18 have displaced more upwards as compared to FIG. 9*b*.

Figure 9D:
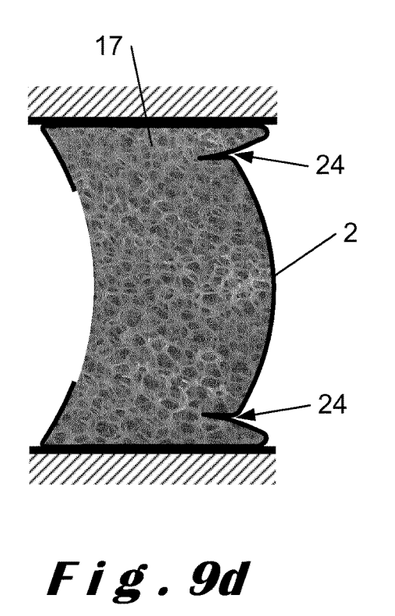

FIG. 9*d* shows the final compression stage of the sealing element 1. It is clear that the foam 17 and the cover layer 18 have bent towards the top surface 2. This is a dangerous effect because there is a risk that the cover layer 18 may come into contact with the wheels of the passing train.

FIGS. 10*a*, 10*b*, 10*c* and 10*d* illustrate a compressible sealing element 1 which has a V-shaped groove 25 and which has been subjected to the same test as the compressible sealing element 1 without groove. The cover layer 18 is adhered substantially over the entire top surface 2 to the foam 17 but is not adhered in the groove 25. These figures illustrate that upon inclusion of the groove 25 the compressible sealing element 2 bends towards the direction of the bottom surface 5. In this way, when the switch rail 12 is closed and the sealing element 1 compressed, there is no risk that the cover layer 18 may come into contact with the wheels of the passing train.

Figure 10A:
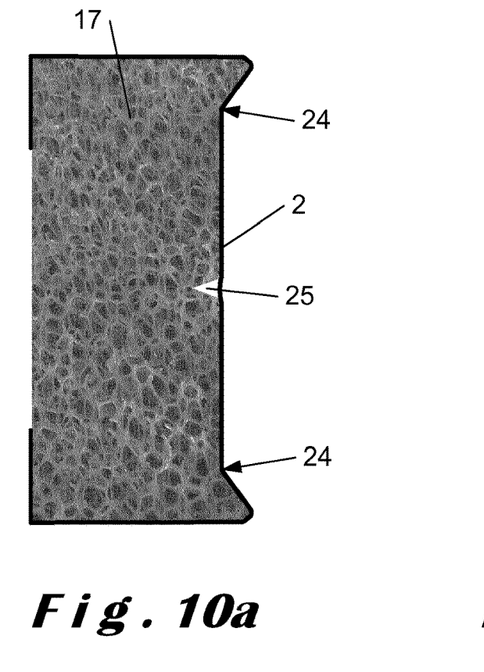
FIGS. 10a, 10b, 10c and 10d are a same view as FIGS. 9a, 9b, 9c and 9d and illustrate a compressible sealing element which has a V-shaped groove before lateral compression (10a) and at 3 moments during lateral compression (10b, 10c and 10d).The compressible sealing elements 1 illustrated in their uncompressed state in FIGS. 1, 3, 5, 8a, 8b, 8c, 9a and 10a are elongated elements which have a substantially constant, mainly rectangular cross-section. They have a top surface 2, two opposite lateral surfaces 3, 4, and a bottom surface 5. The top surface 2 has two upwardly projecting ridges 6 extending respectively along one of the two opposite lateral sides of the sealing element 1.
Figure 10B:
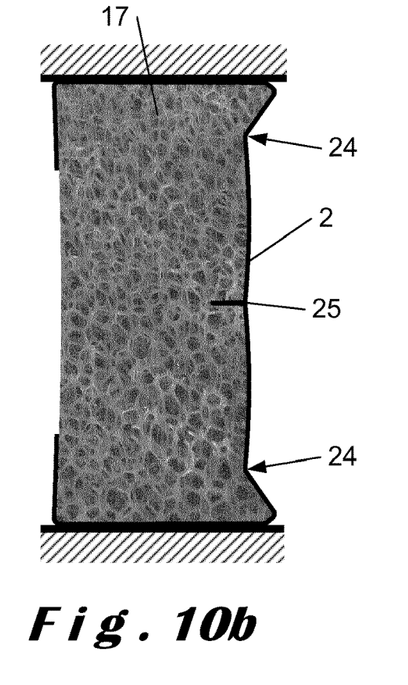

FIG. 10*b* illustrates that during the first stage of compression the groove 25 has been completely compressed and the cover layer 18 has moved into the groove 25. Upon comparison with FIG. 9*b* it is clear that the angle of the corners 24 of the cover layer 18 near the ridges 6 didn't became acute as in FIG. 9*b*.

Figure 10C:
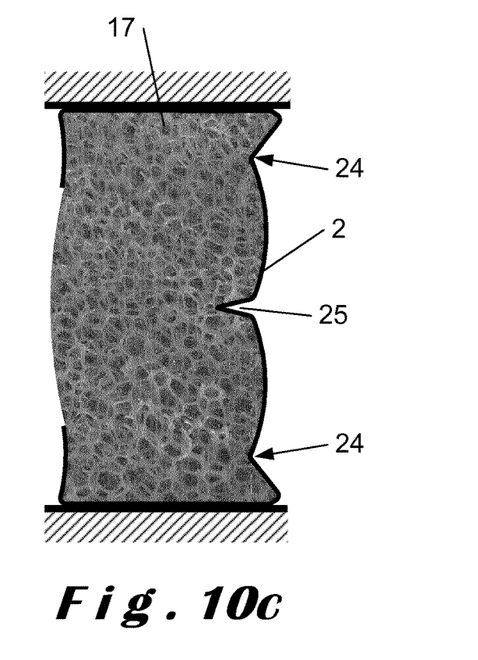
Figure 10D:
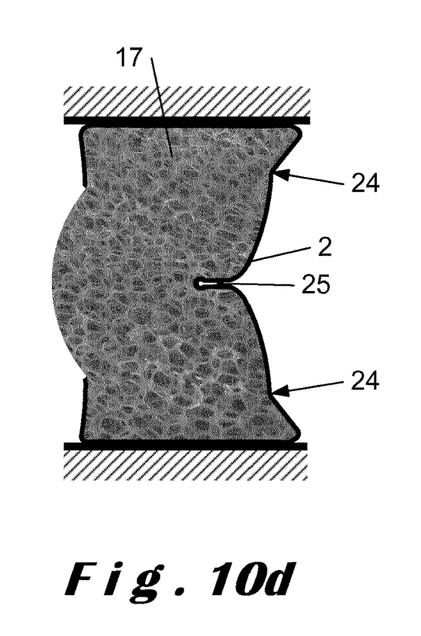

FIGS. 10*c* and 10*d* illustrate that upon further compression the cover layer 18 and the foam underneath the cover layer 18 is displaced further downwards near the centre of the sealing element 1, while near the corners 24 the cover layer 18 remains at approximately the same height. The foam 17 and the cover layer 18 have therefore bent towards the bottom surface 6 instead of upwards so that there is no risk that the cover layer 18 may come into contact with the wheels of a passing train or tram.

The invention claimed is:

1. A method for filling at least partially the gap between a stock rail and a switch rail in a railway switch, in particular for preventing the railway switch from being blocked by accumulation of materials such a snow and/or dirt in said gap, in which method at least one compressible sealing element, which comprises at least one piece made of a resilient foam, is inserted in said gap, which sealing element has a top surface, two opposite lateral surfaces and a bottom surface, with a rectangular cuboid circumscribing the sealing element and having a top face tangent to said top surface, two lateral faces tangent to said two lateral surfaces and a bottom face tangent to said bottom surface having, in the uncompressed state of the sealing element, a predetermined total volume, wherein said foam has an open-cell content of at least 50% and such a hardness that it requires a force of less than 2000 N to compress the sealing element per meter length thereof in a direction perpendicular to the lateral faces of said rectangular cuboid until the total volume of the rectangular cuboid circumscribing the compressed sealing element is reduced to 60% of said predetermined total volume, and wherein the sealing element comprises a water-impermeable cover layer which extends at least over said top surface.

2. The method according to claim 1, wherein said step of inserting said sealing element in said gap comprises compressing said sealing element between the switch rail and the stock rail in the open position of the switch rail so that the rectangular cuboid circumscribing the compressed sealing element in the open position of the switch rail has a volume which is at least 5% smaller than said predetermined total volume.

3. The method according to claim 1, wherein the switch rail and the stock rail have a widened head and a widened base connected to one another by a vertical web (23), said step of inserting said sealing element in said gap comprises clamping the sealing element between the head and the base of the switch rail and between the head and the base of the stock rail or fitting the sealing element between the heads and bases with no clearance or with a clearance which is smaller than 10 mm.

4. The method as claimed in claim 1, wherein said top surface has two upwardly projecting ridges extending respectively along one of the two opposite lateral surfaces of the sealing element.

5. The method as claimed in claim 1, wherein said sealing element has a longitudinal direction and comprises an elongated groove in the top surface of said piece of foam which extends in said longitudinal direction, the groove being sized and located with respect to the lateral faces to prevent the sealing element from bending upwards, in the direction from said bottom surface to said top surface upon a lateral compression of the sealing element to 60% of said predetermined total volume.

6. The method as claimed in claim 5, wherein in the uncompressed state of the sealing element the groove is located in the middle 60% of the top surface.

7. The method as claimed in claim 5, wherein in the uncompressed state of the sealing element the groove has a width relative to the distance between the lateral faces of the rectangular cuboid in the uncompressed state of at least 1% of said distance, which width is smaller than 25% of said distance.

8. The method as claimed in claim 5, wherein in the uncompressed state of the sealing element the groove has a depth relative to the width thereof of at least 90% of said width.

9. The method as claimed in claim 1, wherein said cover layer is supported underneath said top surface by said foam and is adhered over substantially the entire top surface of the sealing element to said foam.

10. The method as claimed in claim 9, wherein said cover layer is laminated onto said foam, or said cover layer comprises a coating layer which is applied, in liquid form, onto said foam, or said foam is moulded against said cover layer, or said cover layer comprises an integral skin layer produced when moulding said foam.

11. The method as claimed in claim 1, wherein said foam has such a hardness that said force is smaller than 1500 N per meter length of the sealing element.

12. The method as claimed in claim 1, wherein said foam has a CDH value at 40% compression, measured in accordance with ISO 3386-1:1986, smaller than 20 kPa.

13. The method as claimed in claim 1, wherein said foam has an open-cell content of at least 70%.

14. The method as claimed in claim 1, wherein said foam has a resilience, measured in accordance with ASTM D 3574-11 H, which is larger than 25%.

15. The method as claimed in claim 1, wherein in the uncompressed state of the sealing element said resilient foam has a volume which is at least equal to 25% of the predetermined total volume of said rectangular cuboid.

16. The method as claimed in claim 1, wherein in the uncompressed state of the sealing element the lateral faces of said rectangular cuboid have a height (h) of at least 50 mm, which height (h) is smaller than 130 mm.

17. The method as claimed in claim 1, wherein said foam has a water uptake, determined at 25 deg. C. in accordance with the French standard UEAtc H.1 MOD1, of less than 150 g/m$^2$.

18. The method according to claim 1, wherein said step of inserting said sealing element in said gap comprises compressing said sealing element between the switch rail and the stock rail in the open position of the switch rail so that the rectangular cuboid circumscribing the compressed sealing element in the open position of the switch rail has a volume which is at least 10% smaller than said predetermined total volume.

19. The method according to claim 1, wherein the switch rail and the stock rail have a widened head and a widened base connected to one another by a vertical web (23), said step of inserting said sealing element in said gap comprises clamping the sealing element between the head and the base of the switch rail and between the head and the base of the stock rail or fitting the sealing element between the heads and bases with no clearance or with a clearance which is smaller than 5 mm.

* * * * *